United States Patent
Choi (10) Patent No.: US 7,465,511 B2
(45) Date of Patent: Dec. 16, 2008

(54) LIQUID FUEL MIXING APPARATUS AND DIRECT LIQUID FEED FUEL CELL HAVING THE SAME

(75) Inventor: Kyoung Hwan Choi, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 619 days.

(21) Appl. No.: 10/936,702

(22) Filed: Sep. 9, 2004

(65) Prior Publication Data

US 2005/0130010 A1 Jun. 16, 2005

(30) Foreign Application Priority Data

Oct. 1, 2003 (KR) .................. 10-2003-0068325

(51) Int. Cl.
*H01M 8/10* (2006.01)
*H01M 2/02* (2006.01)

(52) U.S. Cl. .............. 429/30; 429/34; 429/38; 239/303

(58) Field of Classification Search ............ 429/34, 429/38, 39, 30; 239/303; 220/529, 530
See application file for complete search history.

(56) References Cited

U.S. PATENT DOCUMENTS

| | | | |
|---|---|---|---|
| 6,303,244 B1 * | 10/2001 | Surampudi et al. | ............ 429/17 |
| 6,306,285 B1 | 10/2001 | Narayanan et al. | .......... 205/787 |
| 2003/0031908 A1 | 2/2003 | Bostaph et al. | |
| 2003/0138678 A1 | 7/2003 | Preidel | |
| 2005/0084720 A1 * | 4/2005 | Becerra et al. | ................ 429/13 |

* cited by examiner

*Primary Examiner*—Raymond Alejandro
(74) *Attorney, Agent, or Firm*—H.C. Park & Associates, PLC

(57) ABSTRACT

Provided may be a liquid fuel mixing apparatus and a direct liquid feed fuel cell having the same. The liquid fuel mixing apparatus comprises a liquid fuel tank and a water tank, and a liquid fuel mixer that mixes a liquid fuel supplied from the liquid fuel tank and liquid supplied from water tank, the liquid fuel mixer located to contact the liquid fuel in the liquid fuel. The liquid fuel mixer comprises, a water channel through which the liquid supplied from the water tank may flow, and a liquid fuel permeable membrane, which allows the liquid fuel to penetrate therethrough to the water channel but does not allow water in the water channel to penetrate therethrough to the liquid fuel tank.

20 Claims, 11 Drawing Sheets

LIQUID FUEL MIXING APPARATUS AND DIRECT LIQUID FEED FUEL CELL HAVING THE SAME

BACKGROUND OF THE INVENTION

This application claims the priority of Korean Patent Application No. 2003-68325, filed in the Korean Intellectual Property Office on Oct. 1, 2003, the disclosure of which is incorporated herein in its entirety by reference.

1. Field of the Invention

The present invention may relate to a liquid fuel mixer and a direct liquid feed fuel cell having the same. More particularly the invention may relate to a liquid fuel mixer having a permeable membrane that allows liquid fuel to permeate into water or a dilute liquid fuel through micropores, and to a direct liquid feed fuel cell having the same.

2. Description of Related Art

A direct liquid feed fuel cell may be an apparatus that generates electricity by electrochemical reaction of an organic fuel, such as methanol or ethanol, and an oxidant, such as oxygen. Since fuel may be directly fed to the cell, the direct liquid feed fuel cell may have several advantages such as very high energy density and power density. It may also have the advantages of not requiring a peripheral device such as a reformer, and of easing fuel storing and supply.

Figure 1:
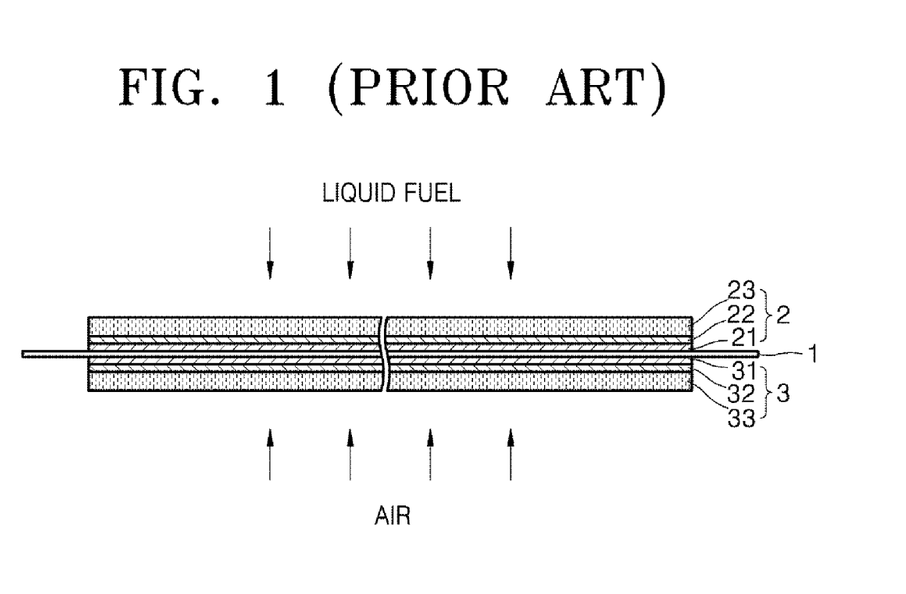
FIG. 1 is a cross-sectional view of a direct liquid feed fuel cell.

As depicted in FIG. 1, the direct liquid feed fuel cell may include an anode 2, a cathode 3, and an electrolyte membrane 1 interposed between the two electrodes 2 and 3. The anode 2 and cathode 3 may include diffusion layers 22 and 32 for supplying and diffusing fuel, as well as catalyst layers 21 and 31 for oxidation and reduction reaction of the fuel and oxygen. The anode 2 and cathode 3 may also include and electrode support layers 23 and 33 respectively. The catalyst for electrode reaction may include a precious metal having a superior catalytic characteristic at low temperature such as platinum. However, in order to avoid catalyst poisoning caused by a by-product from the reaction, e.g., CO, it may be desirable to select an alloyed catalyst containing a transition metal such as ruthenium, rhodium, osmium, or nickel. Waterproofed carbon paper or carbon cloth for easy fuel supply and dissipation of the reaction products may be used for the electrode support. An electrolyte membrane may be a polymer membrane having a thickness in a range of approximately 50~200 μm.

A direct methanol fuel cell (DMFC) may be an example of a direct liquid feed fuel cell. A proton exchange membrane may be used as the electrolyte membrane. The electrochemical reaction of the DMFC may include an anode reaction in which fuel may be oxidized and a cathode reaction in which an oxidant may be reduced.

An example of each reaction can be described as follows.

[Reaction 1]

$$CH_3OH+H_2O \rightarrow CO_2+6H^++6e^-$$ (Anode reaction)

[Reaction 2]

$$\tfrac{3}{2} O_2+6H^++6e^- \rightarrow 3H_2O$$ (Cathode reaction)

[Reaction 3]

$$CH_3OH+\tfrac{3}{2} O_2 \rightarrow 2 H_2O+CO_2$$ (Overall reaction)

At the anode 2 where an oxidation reaction (reaction 1) occurs, one carbon dioxide, six hydrogen ions, and six electrons are produced. The produced hydrogen ions migrate to the cathode 3 through a proton exchange membrane 1. At the cathode 3 where a reduction reaction (reaction 2) takes place, water may be produced by the reduction reaction between hydrogen ions, electrons transferred from an external circuit, and oxygen. Accordingly, water and carbon dioxide may be produced as a result of an electrochemical reaction (reaction 3) between methanol and oxygen.

A theoretical voltage output from a single cell of a DMFC may be approximately 1.2 V. However, an open circuit voltage at ambient temperature and atmospheric pressure falls below 1 V due to a voltage drop caused by an activation overpotential and a resistance overpotential. Thus, under practical conditions, the operating voltage may lie in the approximate range of 0.4~0.6 V. Accordingly a plurality of single cells connected in series may be required to obtain higher voltages.

A stack cell may be formed by stacking several single cells connected in series electrically. Adjacent single cells electrically connected to each other by an electrical conductive bipolar plate (not shown) may be interposed between the single cells.

The bipolar plate (not shown) can be formed of a graphite block that may have high mechanical strength, high electrical conductivity, and good machining properties. A block of a composite material containing a metal or a polymer can be also used as the bipolar plate.

Flow channels for independently supplying fuel and air may be formed on the both faces of the bipolar plate. The bipolar plate placed within the stack may have a channel for supplying fuel on a face and a channel for supplying air on an opposite face, and bipolar plates (more precisely, monopolar plates because only one face may be working) placed on the uppermost or the lowermost of the stack may have a channel for supplying fuel or air.

Figure 2:
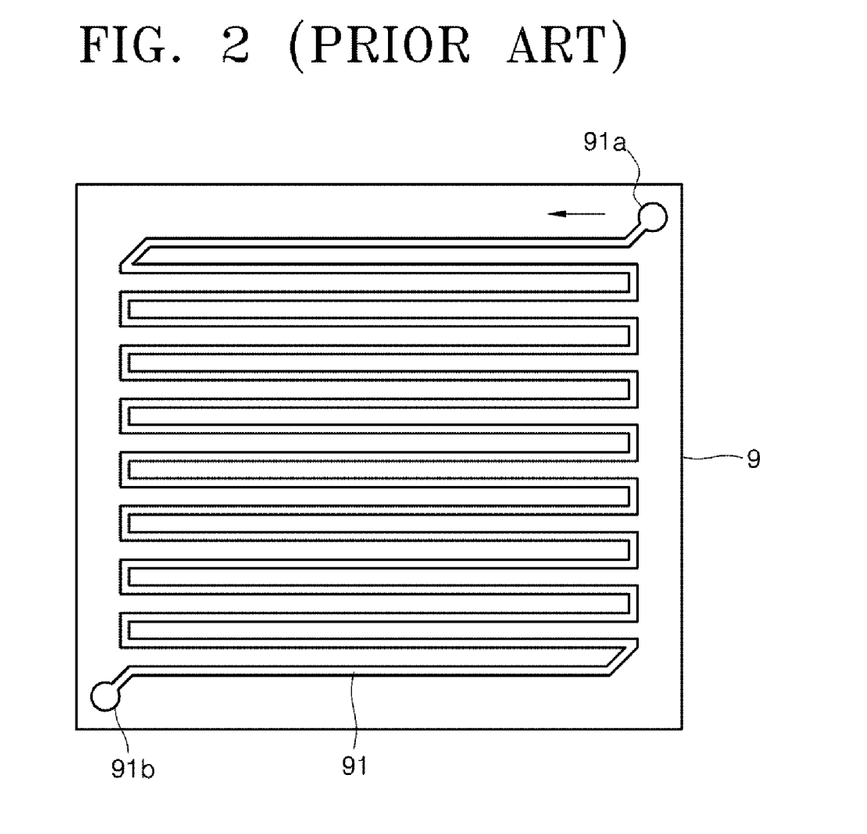
FIG. 2 is a plan view of a conductive plate for supplying fuel to a direct liquid feed fuel cell.

Generally, flow channel 91 for supplying air or fuel may be formed on an entire surface of a conductive plate 9 in series and parallel or in a serpentine shape (other shapes are not excluded) so as to flow air or fuel. As illustrated in FIG. 2, the flow channel 91 may have a serpentine shape. Such a device may include an inlet 91a for fuel or air, and an outlet 91b for fuel or air.

A fuel supply system for supplying fuel to the fuel cell or fuel cell stack comprises a fuel tank for storing liquid fuel, a fuel pump for transferring liquid fuel from the fuel tank to the fuel cell or fuel cell stack, and a compressor or an air pump for supplying oxidant, e.g., air.

Since methanol and water theoretically reacts 1:1 (mole ratio) according to the above equation (reaction 1), it may be possible to use a mixture (approximately 64% by weight) of 1 mole of methanol to 1 mole of water. However, if the methanol concentration is too high, such as methanol to water ratio may be 1:1, then methanol crossover through the electrolyte membrane, thereby reducing the efficiency of the fuel cell. Therefore, in general, a low concentration of 2~5M (6~16% by weight) of methanol may be used. On the other hand, if the methanol concentration is too low, which means that a ratio of methanol may be very low in a given volume, energy output, for example, electricity generation may be very small. In order to get a higher energy output, it may be necessary to supply a large amount of fuel by a fuel pump to a stack cell.

Figure 3:
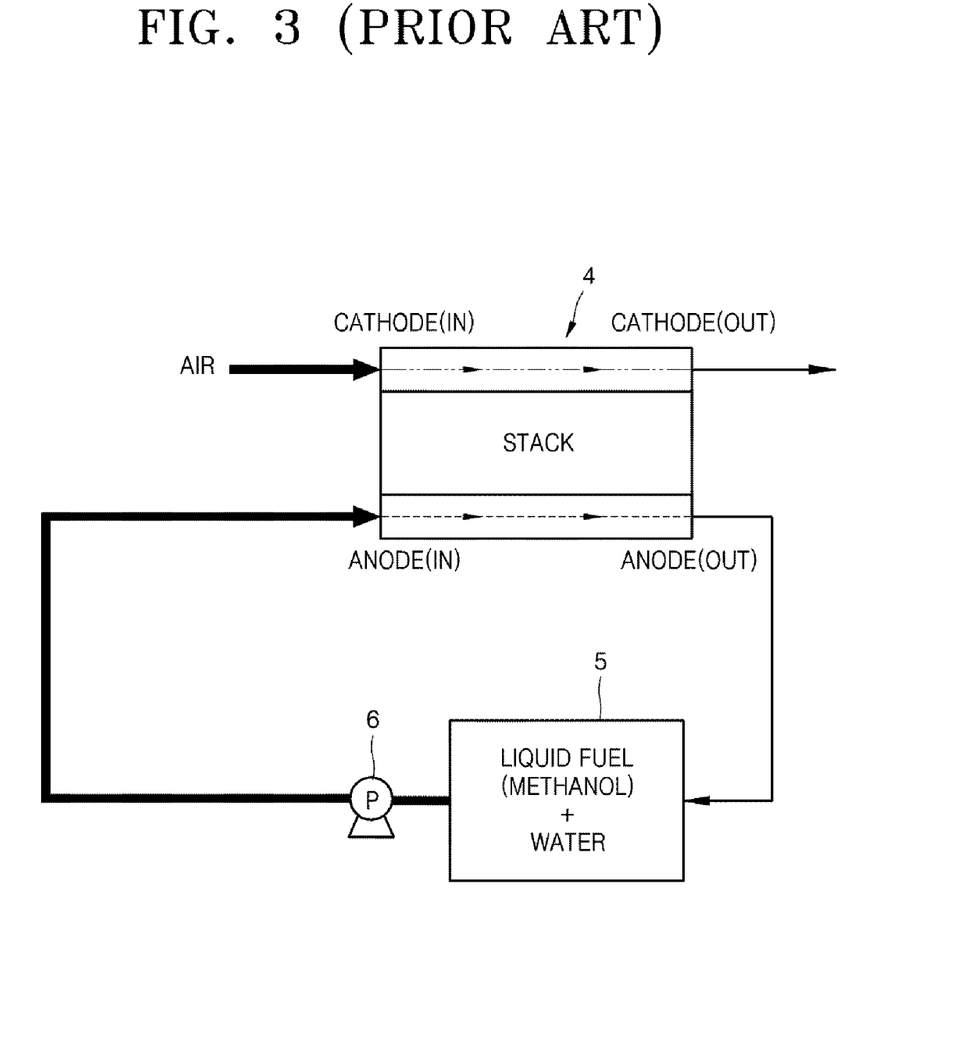
FIG. 3 is a schematic configuration of a direct liquid feed fuel cell system.

FIG. 3 is a schematic illustration of a typical mixed fuel circulation system of a DMFC showing supply and recovery of a fuel mixture. As shown in FIG. 3, air for reduction reaction may be supplied to a cathode of a fuel cell stack 4, and the unreacted air at the cathode may be exhausted to atmosphere. A liquid fuel, e.g., a mixture of methanol and water from a mixed fuel tank 5, may be pumped to an anode in the fuel cell stack 4 and an unreacted fuel may be circulated to the mixed fuel tank 5 by a fuel pump 6.

In such a fuel circulating system, consumption of methanol in liquid fuel by the electrochemical reaction dilutes the methanol concentration of the liquid fuel in the fuel cell stack and the mixed fuel tank. Consequently, the increase in the water content and the decrease in the methanol content in the mixed liquid fuel cause gradual degradation of power generation efficiency. Also, a DMFC system using a diluted liquid fuel as depicted in FIG. 3 may have a drawback in that operation for long hours may be difficult because the storing capacity of mixed fuel may be limited by fuel storage and the methanol concentration in the mixed fuel tank becomes diluted as the operation proceeds.

As a solution to this problem, a method wherein mixed fuel may be supplied to the fuel cell stack after being mixed in a fuel mixer by taking methanol and water from separated storages was proposed and disclosed in U.S. Pat. No. 6,303,244.

Figure 4:
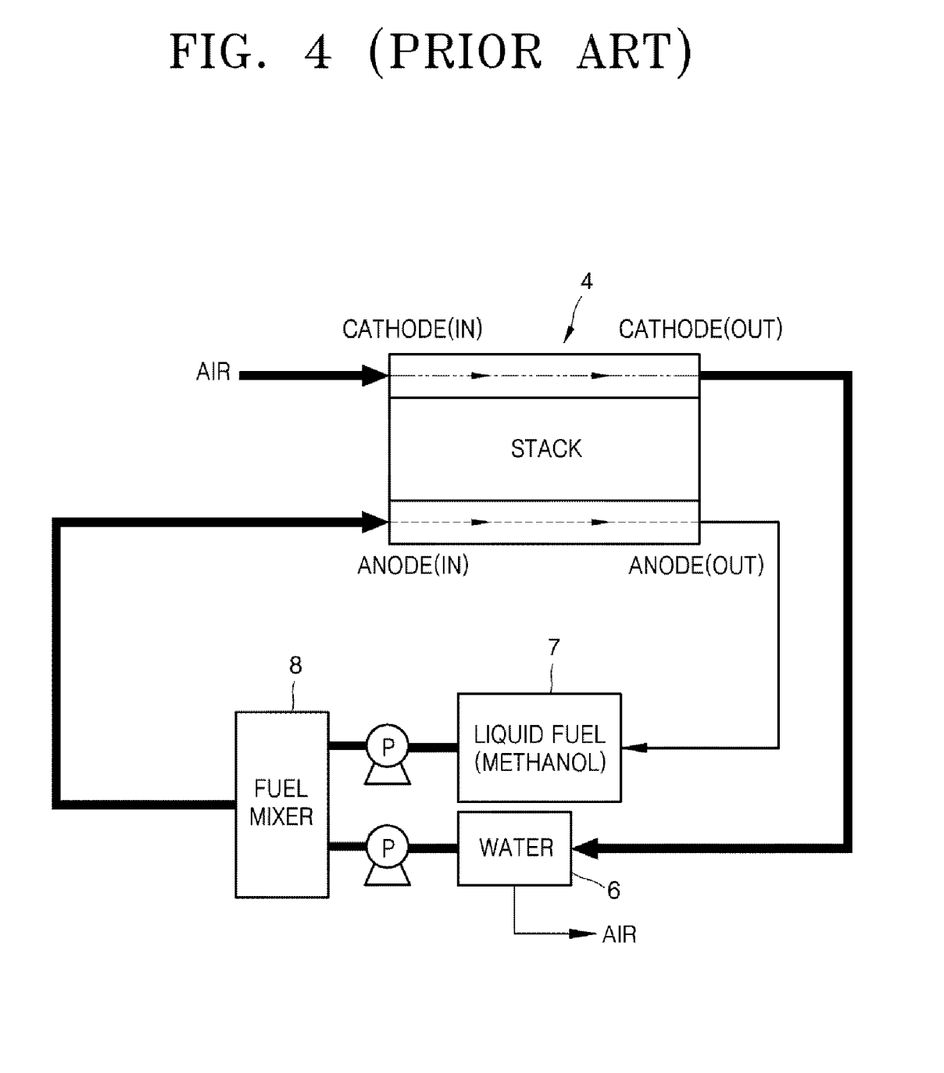
FIG. 4 is a schematic configuration of another direct liquid feed fuel cell system.

FIG. 4 is a schematic illustration of another mixed fuel circuit of a DMFC system that may have a methanol storage separate from a water storage.

As shown in FIG. 4, air for a reduction reaction may be supplied to a cathode into the fuel cell stack 4, and the unreacted air at the cathode may be exhausted to the atmosphere. The water that may be produced as a by-product of the electrochemical reaction may be recovered to a water storage 6. Methanol in a high concentration or pure methanol may be stored in a methanol storage 7.

Liquid fuels, e.g., methanol and water, may be stored in separate storages 6 and 7, respectively, and pumped by an individual pump P to a fuel mixer 8 from the separate storages 6 and 7, and then the mixed fuel may be supplied to an anode of the fuel stack 4.

This system may have advantages in that the volume of water storage may be largely reduced because methanol and water may be stored separately, and long term operation may be possible since the storing volume of methanol can be increased. However, this system also may have the disadvantage of requiring an additional fuel mixer for mixing the separately stored methanol and water. Also, this system may have another disadvantage in that since a mixed fuel may be recycled by supplying and recovering, the separation of unreacted methanol from water may be practically impossible. The mixed fuel should be circulated in the mixed state as a system in FIG. 3, thus there may be a same drawback from the circulation of mixed fuel.

Meanwhile, a system of controlling a ratio of water to methanol by measuring the methanol concentration at the fuel mixer using a methanol sensor was disclosed in U.S. Pat. No. 6,306,285. Nevertheless, although a medium or large fuel cell system that generates more than hundreds of Watt can use the methanol sensor, a small fuel cell system can hardly adopt the methanol sensor because of increase in the weight and volume of system.

SUMMARY OF THE INVENTION

The present invention provides a liquid fuel mixing apparatus for mixing a circulating liquid fuel, water, and a high concentration of liquid fuel without using a additional methanol sensor, and a direct liquid feed fuel cell using the same.

The present invention also provides a direct liquid feed fuel cell that can operate longer time compared to a conventional fuel cell with an equivalent volume of fuel.

According to an exemplary embodiment of the present invention, there may be provided a liquid fuel mixing apparatus to mix liquid fuel and water to be supplied to a direct liquid feed fuel cell, comprising a liquid fuel tank and a water tank, and a liquid fuel mixer located to contact the liquid fuel in the liquid fuel tank, which mixes the liquid fuel supplied from the liquid fuel tank and liquid supplied from the water tank, wherein the liquid fuel mixer comprises a water channel through which the liquid supplied from the water tank may flow, and a liquid fuel permeable membrane between the water channel and the liquid fuel in the liquid fuel tank, which allows the liquid fuel to penetrate therethrough to the water channel but does not allow water in the water channel to penetrate therethrough to the fuel tank.

According to the exemplary embodiment of the present invention, the water channel may be formed at a bottom portion of the liquid fuel tank. Sometimes, the liquid fuel mixing apparatus further comprises a wicking member between the permeable membrane and the liquid fuel in the liquid fuel tank. Sometimes, the water channel may be vertically formed at an inner side of the liquid fuel tank.

The liquid fuel mixing apparatus may further include an inclination plate with a predetermined slope at the bottom portion of the liquid fuel storing area of the liquid fuel tank.

Sometimes, the water channel comprises a flow channel having a serpentine shape. Sometimes, the liquid fuel tank and the water tank respectively include a filter for blocking the ingress of dusts and other contaminants thereinto.

The liquid fuel mixing apparatus may further include a feeding pump connected to an outlet of the water channel.

According to another exemplary embodiment of the present invention, there may be provided a direct liquid feed fuel cell comprising a membrane electrode assembly (MEA) that includes an electrolyte membrane having an anode on a first face and a cathode on a second face, a first conductive plate that contacts the anode of the MEA, having flow channels to supply liquid fuel to the anode, a second conductive plate to supply air the cathode, a liquid fuel tank and a water tank, and a liquid fuel mixer located to contact the liquid fuel in the liquid fuel tank, which mixes the liquid fuel supplied from the liquid fuel tank and the liquid supplied from the water tank, and then supplies a mixture of liquid fuel and water to the flow channel, wherein the liquid fuel mixer comprises a water channel through which the liquid supplied from the water tank may flow, and a liquid fuel permeable membrane between the water channel and the liquid fuel in the liquid tank, that allows the liquid fuel to penetrate therethrough to the water channel by concentration difference but does not allow water in the water channel to penetrate therethrough to the fuel tank.

Sometimes, the flow channel, the water tank, and the liquid fuel mixer may be connected to a circulation conduit through which the liquid fuel may be circulating, and air and water passed through the second conductive plate may be recovered to the water tank.

According to still another exemplary embodiment of the present invention, there may be provided a direct liquid feed fuel cell comprising, a fuel cell stack having at least two membrane electrode assemblies (MEAs), wherein each MEA comprises an electrolyte membrane having an anode on a first face and a cathode on a second face, at least a conductive inter plate that contacts an anode of the adjacent MEA and contacts a cathode of a different MEA, interposed between the stack, conductive end plates placed in uppermost and lowermost positions of the fuel stack contacting the facing MEAs, respectively, a flow channel formed inner face of the plates that contact each electrode, through which fuel may flow, a plurality of fuel inlet/outlet holes, each hole forming a fuel supply or withdrawal communicating with the corresponding flow channel, perforated vertically to the plates, a liquid fuel tank and a water tank, and a liquid fuel mixer located to contact the liquid fuel in the liquid fuel tank, that mixes the liquid fuel supplied from the liquid fuel tank and liquid supplied from the water tank, and then supplies a mixture of liquid fuel and water to the flow channel through the fuel inlet/outlet hole, wherein the liquid fuel mixer comprises a water channel through which the liquid supplied from the water tank may flow, and a liquid fuel permeable membrane between the water channel and the liquid fuel in the liquid tank, that allows the liquid fuel to penetrate therethrough to the water channel but does not allow water in the water channel to penetrate therethrough to the fuel tank.

Also, sometimes the fuel inlet/outlet holes connected to the anode, the water tank, and the liquid fuel mixer may be connected to the liquid fuel circulating conduit, and air and water passed through the fuel inlet/outlet holes that connected to the cathode may be recovered to the water tank.

DETAILED DESCRIPTION OF THE INVENTION

Hereinafter, a liquid fuel mixing apparatus and a direct liquid feed fuel cell having the same according to several embodiments of the present invention will be described more fully with accompanying drawings. The drawings and description are for the purposes of illustration and explanation, and are not intended to be limiting. Like reference numerals in the drawings denote like elements.

Figure 5:
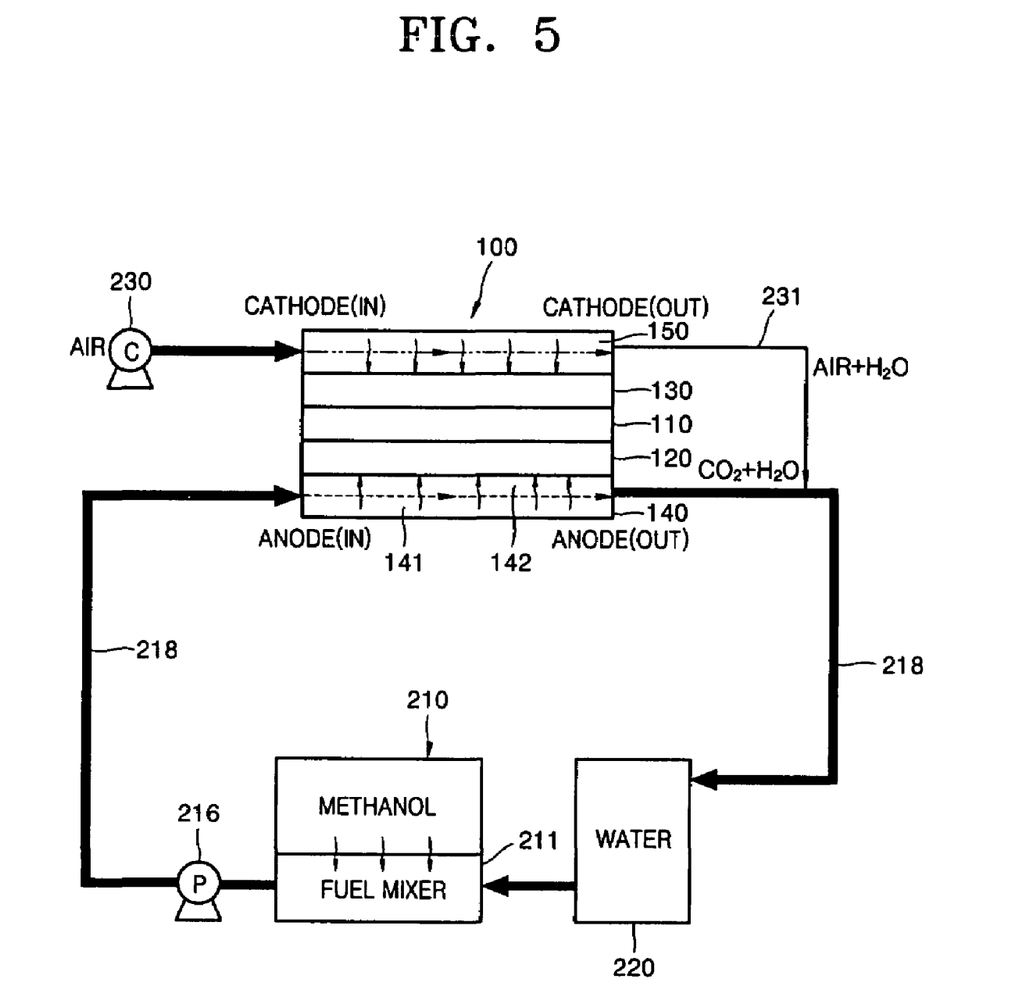
FIG. 5 is a schematic illustration of a DMFC system according to an embodiment of the present invention.
Figure 6:
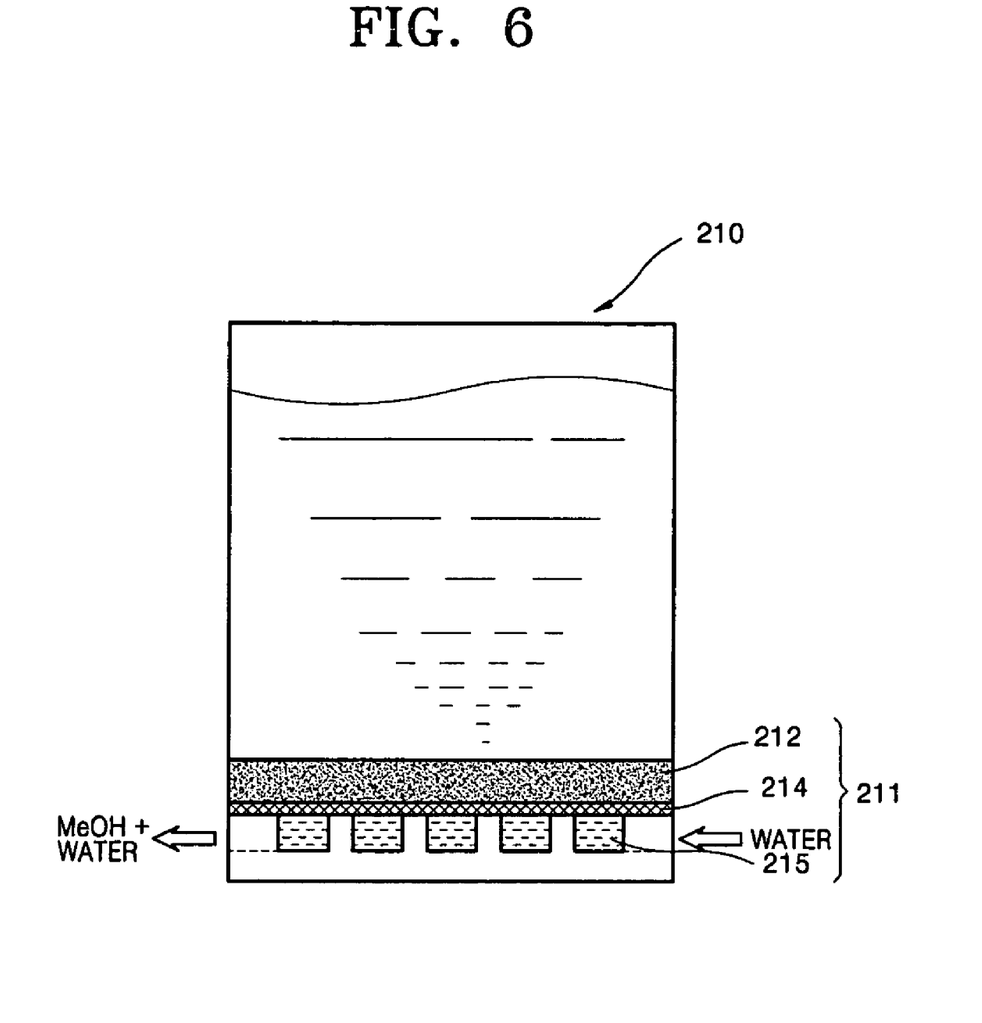
FIG. 6 is a cross-sectional view of a methanol mixer of FIG. 5.

FIG. 5 is a schematic configuration of a DMFC system according to an embodiment of the present invention, and FIG. 6 is a cross-sectional view of the methanol mixer of FIG. 5.

As shown in FIG. 6, a water channel 215 for water flow may be formed at a bottom part of a methanol tank 210 where pure methanol may be stored. A permeable membrane 214 that contacts water flowing through the water channel 215 may be disposed on the water channel 215. The permeable membrane may be made of NAFION™ manufactured by E. I. DuPont Co. or a UF membrane (ultra-filtration membrane). Such a membrane may be referred to as semi-permeable because it readily permits the flow of a fuel (such as methanol or ethanol) but does not so readily permit the flow of water. A wicking member, such as a porous sponge 212 with a predetermined thickness, may be disposed on the permeable membrane 214, and methanol may be stored above the sponge 212.

The water channel 215 may be a serpentine shape as depicted in FIG. 2.

Methanol stored in the methanol tank 210 may flow easily through the permeable membrane 214 because it may have low surface tension, but water may not flow through the permeable membrane 214 so easily (or in some cases not at all) because it may have high surface tension. This particular property (surface tension) is presented only as an example mechanism by which a membrane may permit the flow of one fluid to the exclusion of another fluid.

If a predetermined amount of water is supplied to an end of the water channel 215, the water may flow through the water channel 215 together with methanol that passed through the permeable membrane 214. For example, the water channel 215, the permeable membrane 214, and the porous sponge 212 located under the methanol constitute a fuel mixer 211. Note that what is referred to here as water may contain other ingredients, such as methanol or another fuel, but it is simply referred to as water because it generally requires the addition of methanol or another fuel in order to feed a fuel cell properly.

In FIG. 5 a schematic configuration of a fuel cell system showing a supplying configuration of air and a liquid fuel (methanol) to an MEA is depicted. The MEA may have an electrolyte membrane 110 having an anode 120 on one face and a cathode 130 on an opposite face.

The liquid fuel of the present invention, e.g., methanol, may be mixed with water in the fuel mixer 211 at a bottom of the fuel tank 210 when water passes through the water channel 215 of FIG. 6, and the mixed fuel may be supplied to a liquid fuel supply chamber 140 adjacent to the anode 120 of the direct feed fuel cell 100 through a circulation conduit 218. Air may be supplied to the cathode 130 through an air supply chamber 150 adjacent to the cathode 130 by an air compressor 230 or an air pump.

The liquid fuel supply chamber 140 and the air supply chamber 150 may be disposed on the flow channel formed on a conductive plate, e.g., a bipolar plate. A surplus amount of liquid fuel that passed through the liquid fuel supply chamber 140 may flow through the circulation conduit 218.

A feeding pump 216 may be located at the circulation conduit 218. A mixture of methanol and water may be circulated through the circulation conduit 218 by the feeding pump 216, and then methanol concentration in the mixture may gradually increase as the circulation proceeds. Among the by-products of the air supply chamber 150, water may be recovered and flowed directly to the circulation conduit 218 or to the water tank 220 through a product discharge conduit 231. In FIG. 5, to facilitate understanding, the discharge conduit 231 is shown as directly connected to the circulation conduit 218, although an indirect connection such as through filters or other processors may be more desirable.

In the fuel supplying apparatus according to the present invention, a pure or high concentration liquid fuel, such as methanol, may be stored in the liquid fuel tank 210 and the methanol may be circulated through the circulation conduit 218. Meanwhile, a volume of the water tank 220 can be small relative to the fuel tank 210. This may be because a significant amount of water may be produced at the cathode and may be recovered to be used at the anode rather than supplying the entire amount of water required externally. Accordingly, a large amount of methanol relative to the amount of water in the water tank 220 can be stored, thereby enabling long time operation of the direct feed fuel cell. The methanol concentration in the mixed fuel that may be fed to the anode can be adjusted by controlling the flow rate through the circulating conduit, e.g., by controlling a feed amount of the feeding pump. Such flow rate control may be planned ex ante to avoid the need for measuring the present methanol concentration in the water.

The foregoing embodiment of the present invention may have described a liquid fuel cell having a MEA, but the present invention can also be applied to a fuel cell stack system having a plurality of MEAs.

Figure 7:
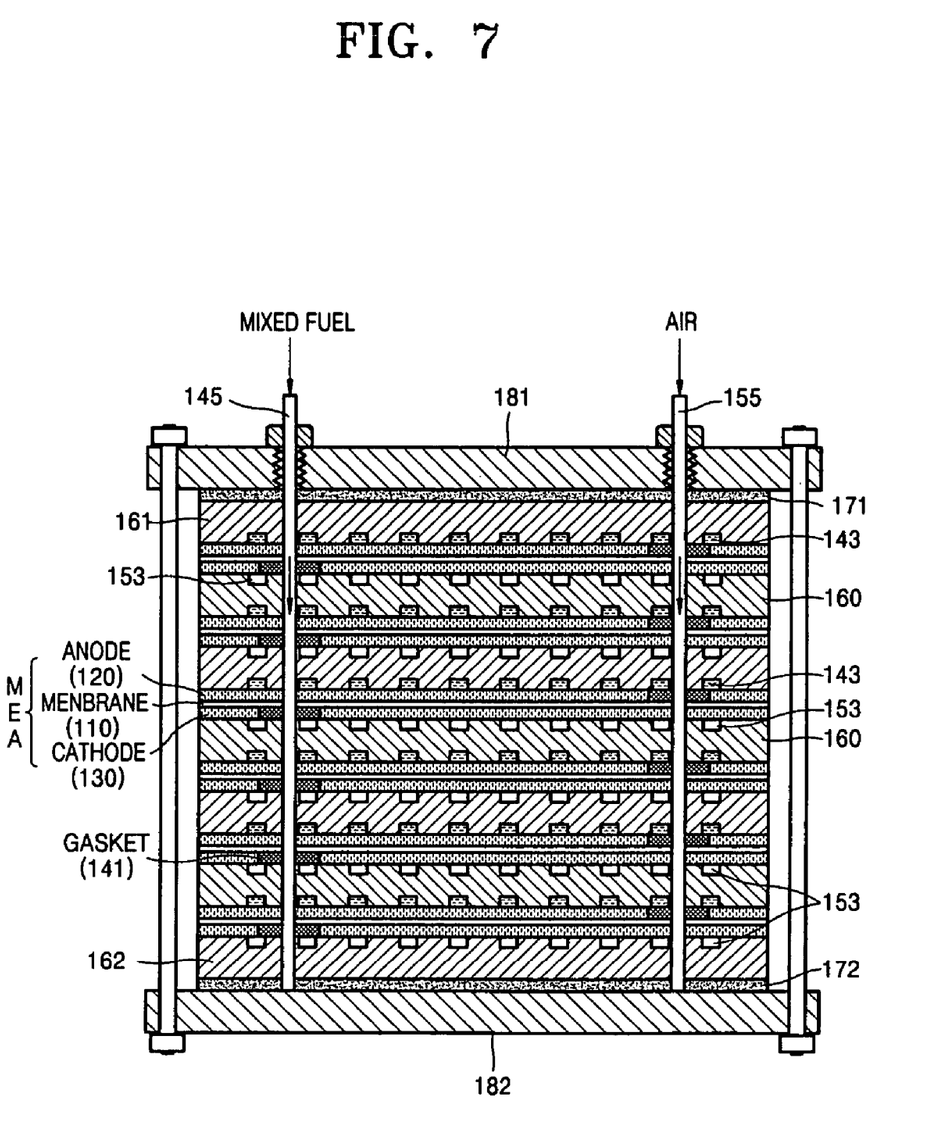
FIG. 7 is a cross-sectional view of a fuel cell stack having a fuel mixing apparatus according to the present invention.

FIG. 7 is a schematic configuration of a fuel cell stack applied with a fuel mixing apparatus according to the present invention.

As shown in FIG. 7, a fuel cell stack comprises a plurality of MEAs. Each MEA comprises an electrolyte membrane 110 having an anode 120 on one face and a cathode 130 on an opposite face. And conductive plates 160, e.g., conductive bipolar plates may be placed between the MEAs. Conductive end plates 161 and 162 may be placed in uppermost and lowermost positions of the fuel cell stack. The conductive end plates 161 and 162 may have practically the same structure as the bipolar plates 160 except they may have flow channels only on the face that contacts the MEA. For example, an inner face of the uppermost end plate 161 contacts a liquid fuel flow channel 143, and an inner face of the lowermost end plate 162 contacts an air flow channel 153. Current collectors 171 and 172 may be disposed on the outer faces of the conductive end plates 161 and 162.

The MEAs, the bipolar plates 160 placed between the MEAs, and the uppermost and the lowermost end plates 161 and 162 may be fixed using end plates 181 and 182.

A plurality of fuel inlet holes 145 and air inlet holes 155, through which a mixed liquid fuel or air may be supplied, may be formed vertically on, in, or with the fuel cell stack. After passing through respective flow channels 143 and 153, unreacted fuels, e.g., liquid fuel, or air and by-products from the electrochemical reaction, e.g., water and carbon dioxide, may be discharged through the respective fuel inlet and outlet holes (not shown). In FIG. 7, only a fuel inlet and outlet hole 145 for a mixed fuel and a fuel inlet and outlet hole 155 for air are depicted. Gaskets 141 for blocking flows in order to form appropriate flow channels may be applied. Such gaskets 141 may be useful in performing flow control.

The circulation conduit 218 and the discharge conduit 231 depicted in FIGS. 5 and 6 can be connected to the fuel inlet and outlet holes 145 and 155 of the fuel cell stack.

Figure 8:
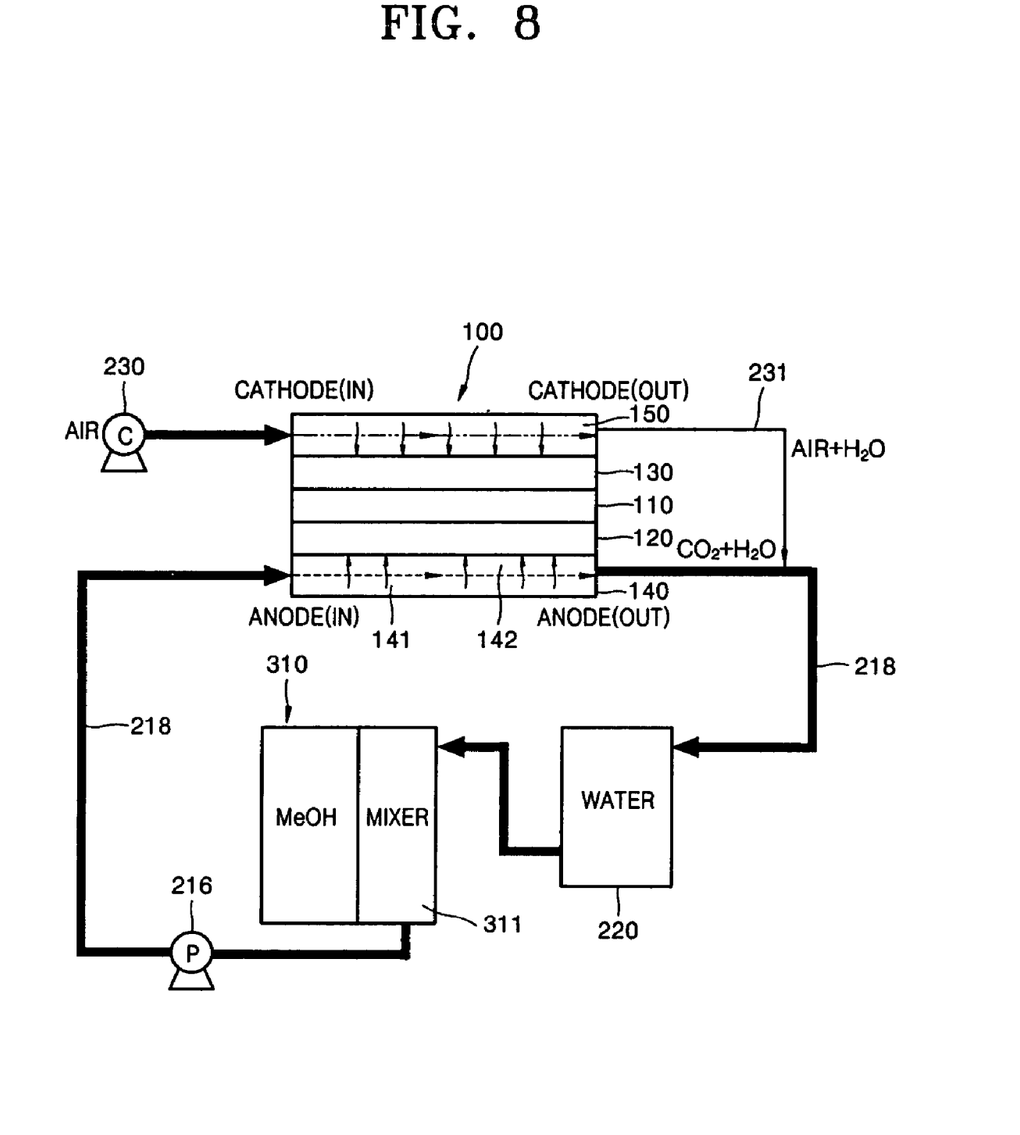
FIG. 8 is a schematic configuration of a DMFC according to a second embodiment of the present invention.
Figure 9:
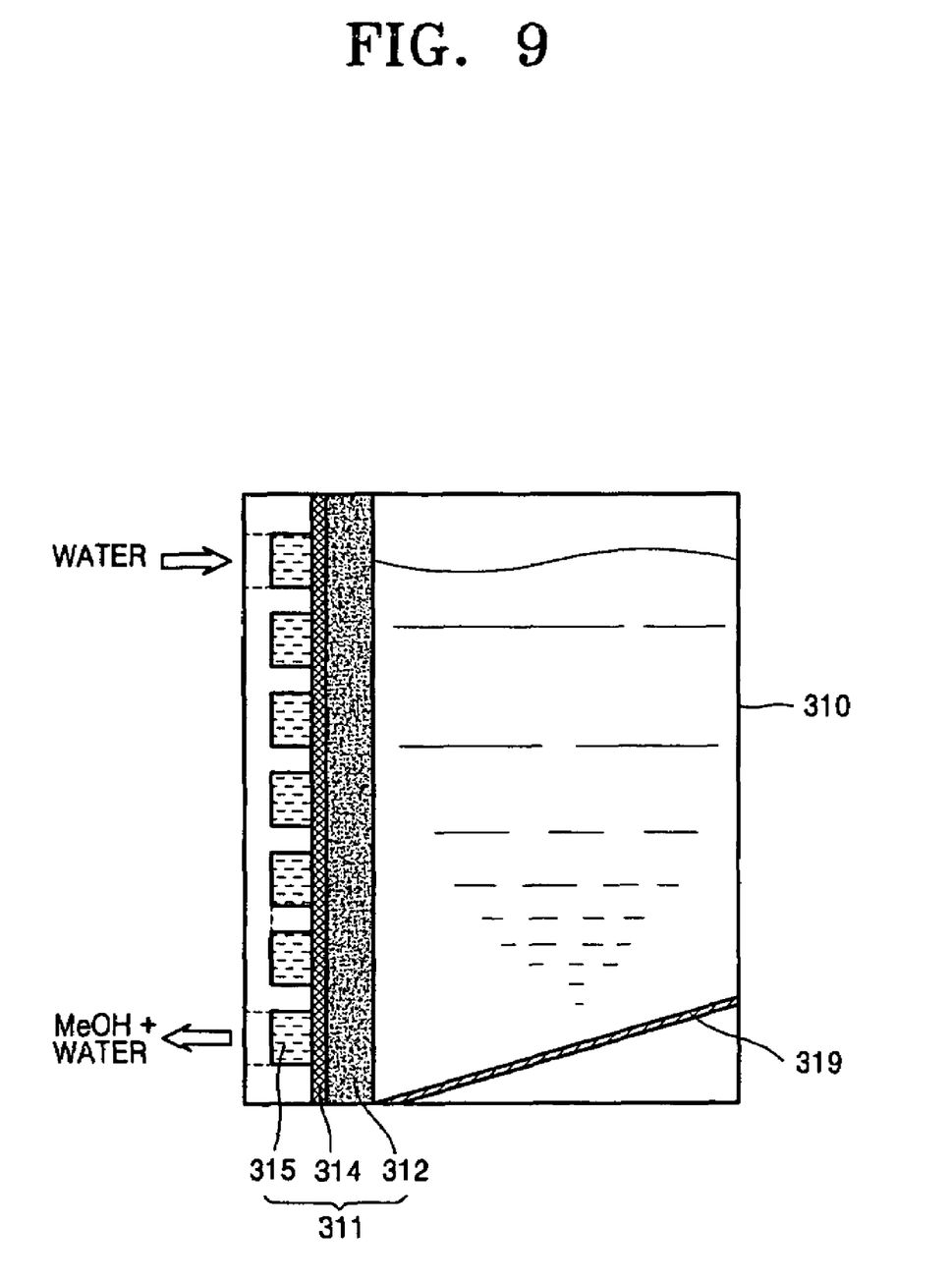
FIG. 9 is a cross-sectional view of the methanol mixer of FIG. 8.

FIG. 8 is a schematic configuration of a DMFC according to a second embodiment of the present invention, and FIG. 9 is a cross-sectional view of the methanol mixer depicted in FIG. 8. The same numerals of the first embodiment are used to the like elements in FIGS. 8 and 9.

As shown in FIG. 9, a water channel 315 for water flow may be formed on an inner side of a methanol fuel tank 310 where pure methanol may be stored. A permeable membrane 314 made, for example, of NAFION™ by DuPont Co. or a UF membrane (ultra-filtration membrane), may be formed on the water channel 315. A wicking member with a predetermined thickness made of porous sponge 312 may be formed on the permeable membrane 314, and pure methanol may be stored on the porous sponge 312.

The water channel 315 may be formed having a serpentine shape as depicted in FIG. 2.

The pure methanol stored in the methanol fuel tank 310 penetrates easily through the permeable membrane 314 because it may have low surface tension, but water may not flow through the permeable membrane 314 because of its high surface tension.

If a predetermined amount of water is supplied to an end of the water channel 315, the water flowing through the water channel 315 mixes with methanol that traversed the permeable membrane 314. For example, the water channel 315, the permeable membrane 314, and the porous sponge 312 located under the methanol may (together with any additional elements) constitute a fuel mixer 311 for mixing methanol and water.

An inclination plate 319 may be placed in the methanol fuel tank 310, and may increase the efficiency of the methanol usage.

As shown in FIG. 8, water pumped from the water tank by a feeding pump 216 may flow through the water channel 315 of FIG. 9. Methanol stored in the methanol fuel tank 310 may be absorbed in a porous sponge 312, and the methanol in the porous sponge 312 may flow through the permeable membrane 314 into the water channel 315. A portion of the methanol mixed with water may be absorbed at the anode through a liquid fuel supply chamber 140, and unreacted diluted methanol may be returned to the water tank 220 through the circulation conduit 218.

On the other hand, forced air may be supplied to the cathode 130 through an air supply chamber 150 by an air compressor 230, and water produced at the cathode 130 may be recovered through a discharge conduit 231 and the circulation conduit 218 into the water tank 220.

In a fuel cell system having a fuel mixer according to the second embodiment of the present invention, water recovered contains methanol. Therefore, the more the circulation repeats, the higher the methanol concentration in the water returning to the water channel 315. However, as the methanol in the methanol fuel tank 310 is consumed, the level of methanol contacting the permeable membrane may decrease. Therefore, the amount of methanol that may flow into the water channel 315 through the porous sponge 312 may decrease. In turn, methanol concentration in the water returning to the water channel 315 may be increased but the amount of pure methanol that penetrates the permeable membrane 314 may be decreased. These two effects may roughly balance one another. Accordingly, the overall methanol concentration in the water flowing through the water channel 315 can be kept at a uniform level.

Figure 10:
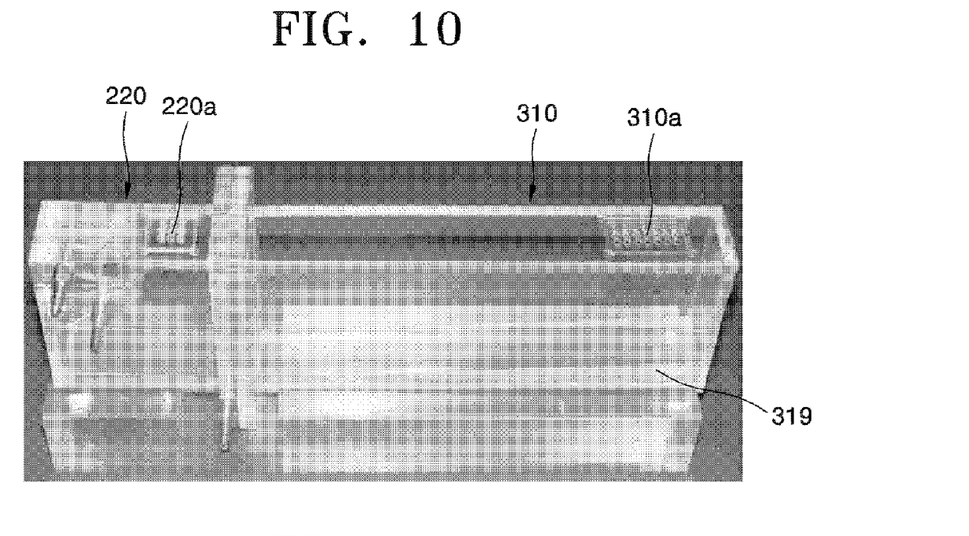
FIGS. 10 through 12 are photo images of a fuel mixer for mixing methanol and water according to the second embodiment of the present invention.
Figure 11:
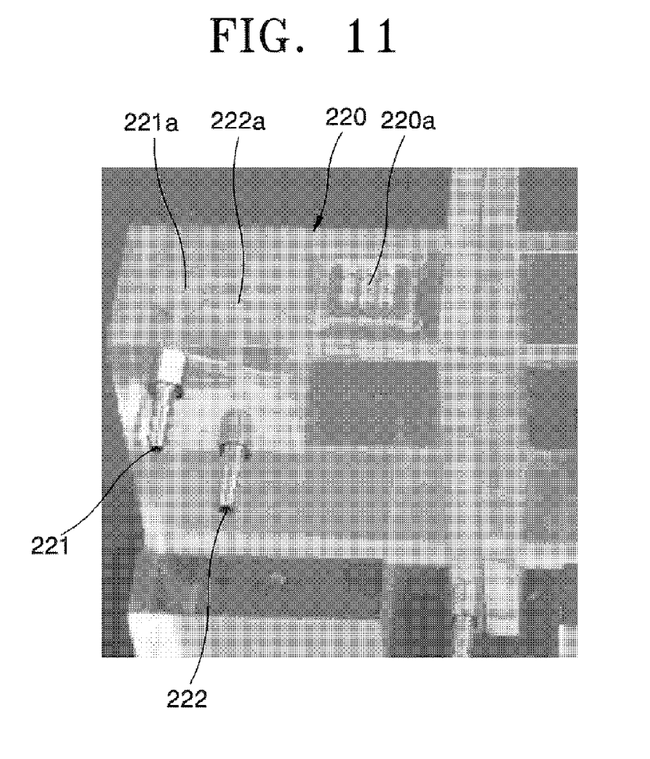
Figure 12:
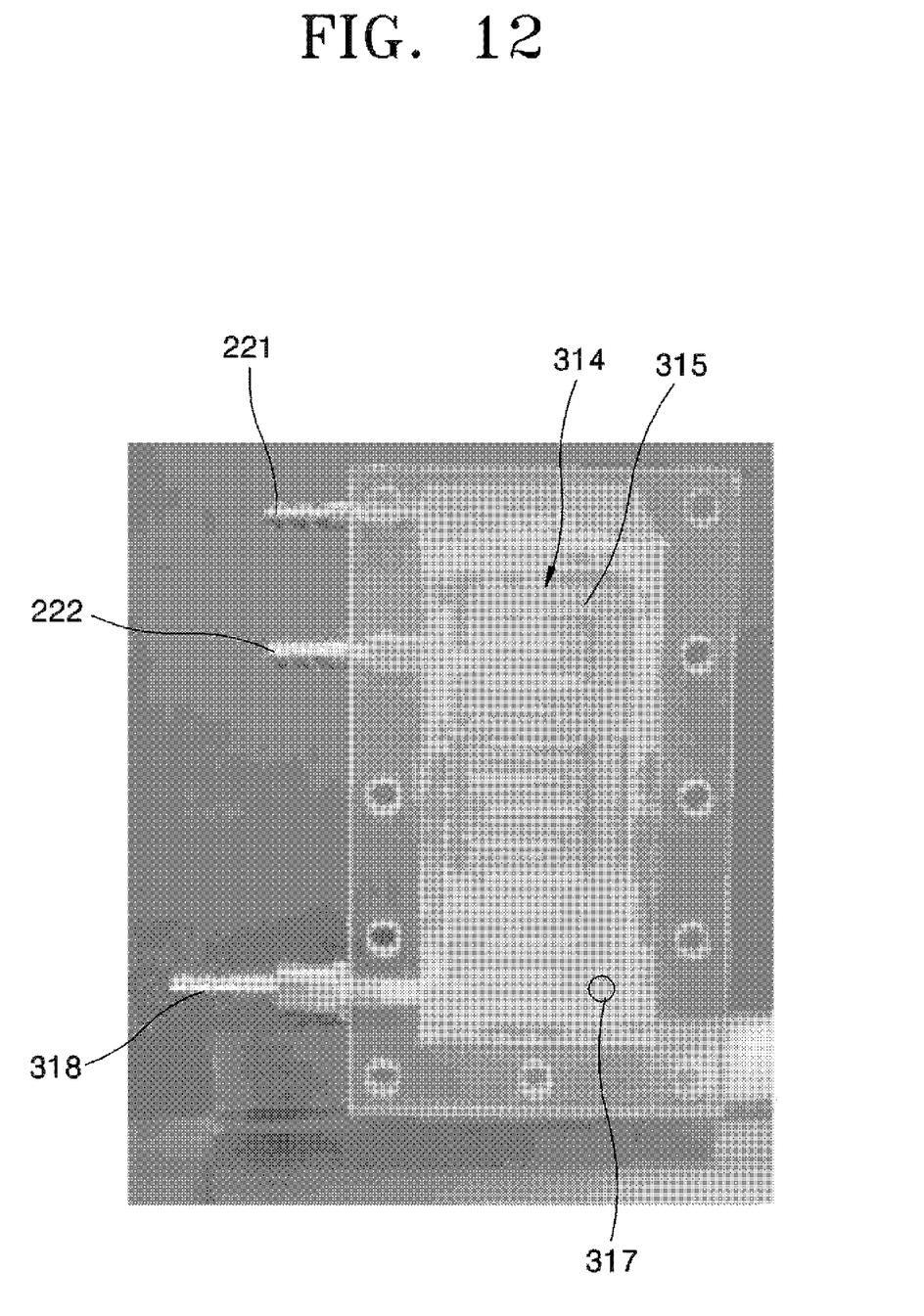

FIGS. 10 through 12 are photo images of the fuel mixer according to the second embodiment of the present invention.

As shown in FIG. 10, a water tank 220 may be located in the left side and a methanol fuel tank 310 may be located in the right side of the photo. Filters 220a and 310a blocking the ingress of dusts into the tanks may be formed on an upper part of each tank 220 and 310. Also, an inclination plate 319 may be formed on the bottom of the methanol fuel tank 310. This inclination plate 319 may be mounted such that an end near to the permeable membrane 314 may have lower elevation than the other end farther from the permeable membrane. The use of the inclination plate 319 in the methanol fuel tank 310 may increase the efficiency of the fuel usage.

As shown in FIG. 11, two nipples may be formed on an upper portion of the water tank 220. A first nipple 221 may be connected to the circulation conduit 218 that passes through the anode 120. The liquid that passed through the anode 120 and may flow through the circulation conduit 218 contains diluted methanol and carbon dioxide ($CO_2$). When methanol and carbon dioxide that passed through the first nipple 221 hits a wall, then the methanol may be returned to the water tank 220 and the carbon dioxide may be ventilated through a ventilation hole 221a. The first nipple 221 and the ventilation hole 221a may constitute a carbon dioxide ($CO_2$) separator.

A second nipple 222 may be connected to the discharge conduit 231 that may be connected from the cathode 130. There may be water and air in the conduit 231. When the air and water that passed though the second nipple 222 hit a wall separating water and air, the water may be returned to the water tank 220 and the air may be ventilated through a ventilation hole 222a formed at upper portion of the water tank 220.

FIG. 12 is a photo image of a water channel 315. As shown in this figure, a third nipple 318 may be connected to the suction side of the feeding pump 216. When the feeding pump 216 is operating, fluid in the water tank 220 may flow upward from the water channel inlet 317 formed on the lower part of the water tank 220, and continues to flow through the flow channel 315 having a serpentine shape to the third nipple 318. At this time, methanol may flow into the water that may flow in the water channel 315 through the permeable membrane 314.

Figure 13:
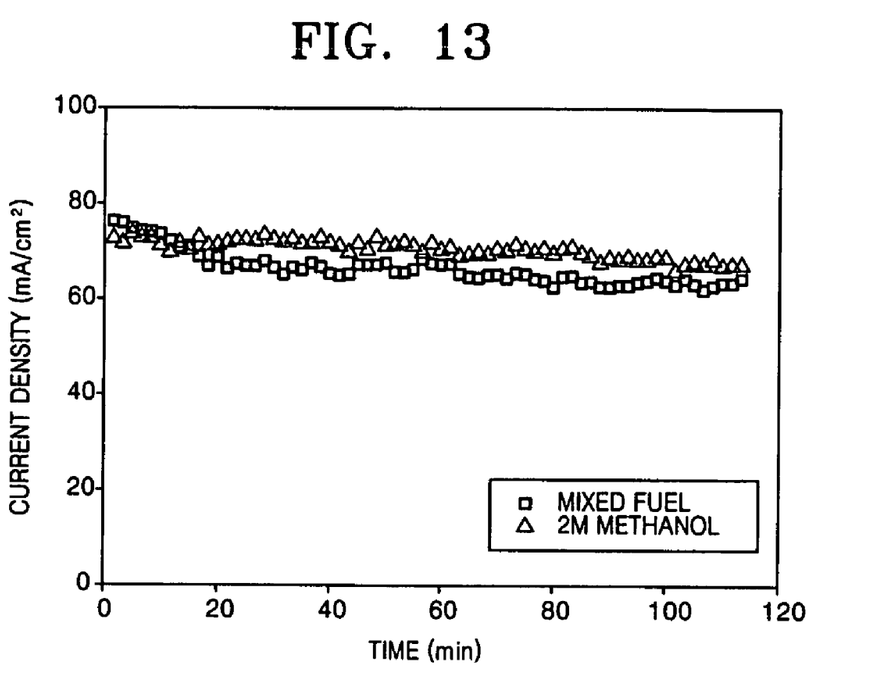
FIG. 13 is a graph showing performance variations in a fuel cell stack using methanol in a concentration of 2 M and liquid methanol mixed by a fuel mixer according to the present invention.

FIG. 13 is a graph showing performance variations of a fuel cell stack using methanol having a concentration of 2 M and methanol mixed by a fuel mixer according to the present invention.

As shown in FIG. 13, when, at constant voltage, methanol in a concentration of 2 M of is supplied, current density may be stable with time. When the mixed fuel mixed by the fuel mixer according to the second embodiment of the present invention is supplied, current density at the constant voltage may also be stable with time, even without using a methanol sensor.

Figure 14:
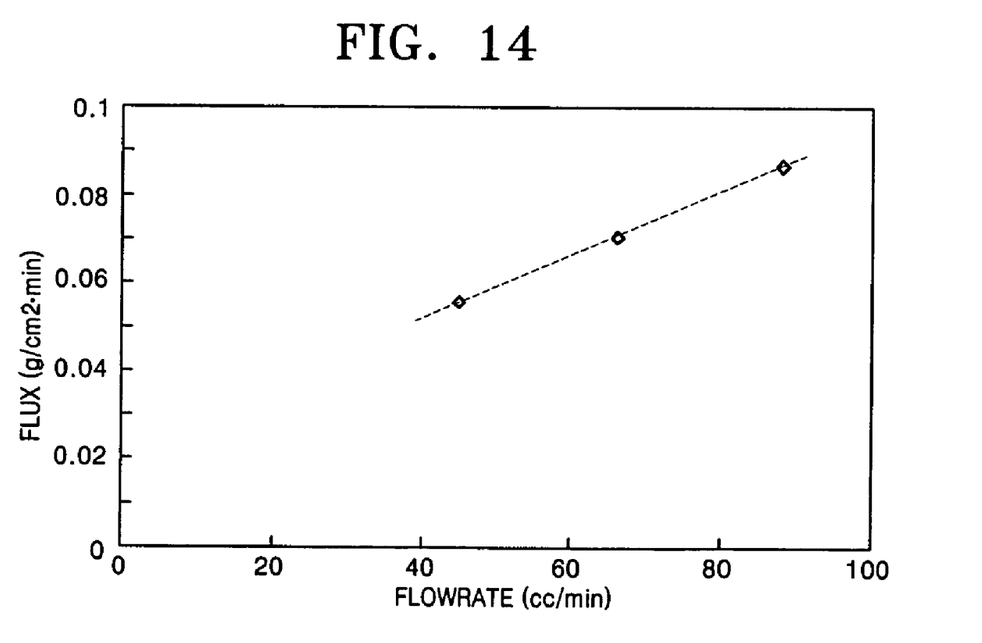
FIG. 14 is a graph showing a variation of permeation flux of methanol that penetrates into the water channel in FIG. 12 according to flow rate of water.

Table 1 summarizes test results of measuring the amount of methanol passing through the permeable membrane when flow rate may be controlled by the feeding pump connected to the third nipple when the surface area of the permeable membrane depicted in FIG. 12 may be 3.7 $cm^2$, and FIG. 14 is a plot of the data in table 1. Recall that such measurement is not required in order to practice at least some embodiments of the present invention.

TABLE 1

| Flowrate (cc/min) | 45 | 36 | 88 |
|---|---|---|---|
| Flux (g/$cm^2$ min) | 0.038 | 0.070 | 0.037 |

As shown in FIG. 14 and Table 1, it may be observed that the flux of methanol passing through the permeable membrane varies linearly according to the variation of flowrate of water supplied to the fuel supplying chamber. Accordingly, the flow of methanol can be controlled by regulating the liquid flowrate in the water channel. This characteristic can be used to control the methanol concentration in the liquid flowing through the water channel, and may be specially suited for the first embodiment of the present invention.

According to the foregoing descriptions of the present invention, water volume in the water tank can be maintained to a certain level if the circulation efficiency of water is kept above 30% since 1 mole of methanol (approximately 40 $cm^3$) produces 2 moles (approximately 36 $cm^3$) of water according to the Reaction 3. Therefore, a higher energy efficiency (quantity of methanol) at the same volume of fuel (methanol+water) than previously can be achieved because the fuel cell system can be operated with a minimum quantity of water.

A direct liquid feed fuel cell using a liquid fuel may have advantages of easy handling and obtaining a large amount of energy at the same volume of fuel compared with gas fuel. However, when a liquid fuel of high concentration may be used in the direct liquid feed fuel cell, then there may be a crossover problem that reduces the efficiency of the fuel cell. Also, the use of a liquid fuel of low concentration decreases the energy density and efficiency at the same volume of fuel. In order to obtain an increased energy density, a liquid fuel of higher concentration may be used and the by-products that contain unreacted methanol and water form the fuel cell stack may be reused.

In the present invention, the amount of water required for initial operation can be significantly reduced by circulating the low concentration methane and the water produced at the cathode, therefore, a larger amount of energy at the same volume can be stored, thereby significantly increasing the energy density.

For example, in a DMFC system having a methanol fuel tank storing capacity of one liter (1,000 $cm^3$) that may be designed, the volume of methanol that can be stored in the fuel tank according to the conventional art may be at most 80 $cm^3$ (6.4% by-weight) and 200 $cm^3$ (16% by-weight) if a liquid fuel having a methanol concentration of 2M and 5M, respectively, is used. But in the present invention, because the volume of water can be reduced below 100 $cm^3$, the volume of methanol that can be stored in the tank may be 900 $cm^3$, which may be 11.3 times and 4.5 times larger than previously, respectively. This may lead to a considerable increase in the energy density of the fuel cell.

As described above, a direct feed fuel cell system according to the present invention provides a liquid fuel storage having high energy density that enables an extension of operation for power generation, permits the use of as few as one feeding pump, reduces the manufacturing cost of fuel cell (since the direct feed fuel system according to the present invention does not use an expensive methanol sensor), and may be suitable for manufacturing a small direct liquid feed fuel cell.

While this invention may has been particularly shown and described with reference to several embodiments thereof, it will be understood by those skilled in the art that various changes in form and details may be made therein without departing from the sprit and scope of the invention as defined by the appended claims.

What is claimed is:

1. A direct liquid feed fuel cell, comprising:
   a membrane electrode assembly (MEA) comprising an electrolyte membrane having an anode on a first face and a cathode on a second face;
   a first conductive plate that contacts the anode of the MEA, having flow channels to supply liquid fuel to the anode;
   a second conductive plate to supply air the cathode;
   a liquid fuel tank;
   a water tank; and
   a liquid fuel mixer located to contact the liquid fuel in the liquid fuel tank, wherein the liquid fuel mixer mixes the liquid fuel supplied from the liquid fuel tank and the liquid supplied from the water tank, and then supplies a mixture of liquid fuel and water to the flow channel, the liquid fuel mixer comprising:
   a water channel through which the liquid supplied from the water tank flows; and
   a liquid fuel permeable membrane between the water channel and the liquid fuel in the liquid fuel tank, wherein the liquid fuel permeable membrane allows the liquid fuel to penetrate therethrough to the water channel but does not allow water in the water channel to penetrate therethrough to the liquid fuel tank.

2. The direct liquid feed fuel cell of claim 1, wherein the water channel is formed at a bottom portion of the liquid fuel tank.

3. The direct liquid feed fuel cell of claim 2 further comprising a wicking member between the permeable membrane and the liquid fuel in the liquid fuel tank.

4. The direct liquid feed fuel cell of claim 1, wherein the water channel is vertically formed at an inner side of the liquid fuel tank.

5. The direct liquid feed fuel cell of claim 4 further comprising a wicking member between the permeable membrane and the liquid fuel in the liquid fuel tank.

6. The direct liquid feed fuel cell of claim 4 further comprising an inclination plate with a predetermined slope at the bottom portion of the liquid fuel storing area of the liquid fuel tank.

7. The direct liquid feed fuel cell of claim 1, wherein the water channel comprises a flow channel having a serpentine shape.

8. The direct liquid feed fuel cell of claim 1, wherein the liquid fuel tank and the water tank respectively include a filter for blocking the ingress of dusts and other contaminants thereinto.

9. The direct liquid feed fuel cell of claim 1, further comprising a feed pump between an outlet of the water channel and the flow channel.

10. The direct liquid feed fuel cell of claim 9, wherein the flow channel, the water tank, and the liquid fuel mixer are connected to a circulation conduit through which the liquid fuel is circulating, and air and water passed through the second conductive plate are recovered to the water tank.

11. A direct liquid feed fuel cell, comprising:
a fuel cell stack having at least two membrane electrode assemblies (MEAs), wherein each MEA comprises an electrolyte membrane having an anode on a first face and a cathode on a second face;
at least a conductive inter plate that contacts an anode of the adjacent MEA and contacts a cathode of a different MEA, interposed between the stack;
conductive end plates placed in uppermost and lowermost positions of the fuel stack contacting the facing MEAs, respectively;
a flow channel, formed inner face of the plates that contact each electrode, throughwhich fuel flows;
a plurality of fuel inlet/outlet holes, each hole forming a fuel supply or withdrawal communicating with the corresponding flow channel, perforated vertically to the plates;
a liquid fuel tank;
a water tank; and
a liquid fuel mixer located to contact the liquid fuel in the liquid fuel tank, wherein the liquid fuel mixer mixes the liquid fuel supplied from the liquid fuel tank and the liquid supplied from the water tank, and then supplies a mixture of liquid fuel and water to the flow channel, the liquid fuel mixer comprising:
a water channel through which the liquid supplied from the water tank flows; and
a liquid fuel permeable membrane between the water channel and the liquid fuel in the liquid fuel tank, wherein the liquid fuel permeable membrane allows the liquid fuel to penetrate therethrough to the water channel but does not allow water in the water channel to penetrate therethrough to the liquid fuel tank.

12. The direct liquid feed fuel cell of claim 11, wherein the water channel is formed at a bottom portion of the liquid fuel tank.

13. The direct liquid feed fuel cell of claim 12, further comprising a wicking member between the permeable membrane and the liquid fuel in the liquid fuel tank.

14. The direct liquid feed fuel cell of claim 11, wherein the water channel is vertically formed at an inner side of the liquid fuel tank.

15. The direct liquid feed fuel cell of claim 14 further comprising a wicking member between the permeable membrane and the liquid fuel in the liquid fuel tank.

16. The direct liquid feed fuel cell of claim 14 further comprising an inclination plate with a predetermined slope at a bottom portion of a liquid fuel storing area of the methanol liquid fuel tank.

17. The direct liquid feed fuel cell of claim 11, wherein the water channel comprises a flow channel having a serpentine shape.

18. The direct liquid feed fuel cell of claim 11, wherein the liquid fuel tank and the water tank respectively include a filter for blocking the ingress of dusts and other contaminants thereinto.

19. The direct liquid feed fuel cell of claim 11, further comprising a feeding pump between an outlet of the water channel and the flow channel.

20. The direct liquid feed fuel cell of claim 19, wherein the flow channel, the water tank, and the liquid fuel mixer are connected to the circulation conduit through which the liquid fuel is circulating, and air and water passed through the fuel inlet/outlet hole communicating to the cathode are recovered to the water tank.

* * * * *